United States Patent [19]

Nicholson

[11] 4,110,514

[45] Aug. 29, 1978

[54] WELD METAL DEPOSIT COATED TOOL STEEL

[75] Inventor: Frederick Nicholson, Floda, Sweden

[73] Assignee: Elektriska Svetsningsaktiebolaget, Gothenburg, Sweden

[21] Appl. No.: 814,453

[22] Filed: Jul. 11, 1977

Related U.S. Application Data

[63] Continuation-in-part of Ser. No. 702,469, Jul. 6, 1976, abandoned.

[30] Foreign Application Priority Data

Jul. 10, 1975 [SE] Sweden .................................. 7507899

[51] Int. Cl.$^2$ .............................................. B32B 15/18
[52] U.S. Cl. .................................. 428/683; 75/126 A; 75/126 F; 428/681; 428/684; 428/685; 428/932; 428/939
[58] Field of Search ............... 428/681, 683, 684, 685, 428/932, 939; 75/126 F, 128 G, 126 A, 128 D

[56] References Cited

U.S. PATENT DOCUMENTS

| | | | |
|---|---|---|---|
| 3,571,553 | 3/1971 | Godai et al. | 219/145 |
| 3,855,015 | 12/1974 | Nemoto et al. | 428/683 |
| 3,901,690 | 8/1975 | Philip | 75/123 H |
| 3,929,428 | 12/1975 | Nishi et al. | 428/684 |

FOREIGN PATENT DOCUMENTS

525,689  1/1954  Belgium .................................. 75/126 F

OTHER PUBLICATIONS

Metals Handbook, 8th Ed., Welding and Brazing, ASM, 1971, pp. 152–156.

*Primary Examiner*—Arthur J. Steiner
*Attorney, Agent, or Firm*—Lerner, David, Littenberg & Samuel

[57] ABSTRACT

A weld metal deposit which is not subject to solidification cracks and which is highly wear-resistant, also to the hot wear to which hot forming tools are subjected is disclosed. The weld metal deposit consists essentially of an air-hardening alloy steel containing 0.55% to 2.0% carbon, 0.2% to 4.0% silicon, 0.2% to 3.0% manganese, 4.0% to 6.5% chromium, 2.5% to 15.0% columbium, 0% to 3.5% strong carbide formers other than columbium, 0% to 0.5% nickel, and the remainder iron with or without incidental impurities. The contents of carbon and columbium have to be in a ratio of one to another as defined by the area indicated in FIG. 1 of the accompanying drawings.

13 Claims, 4 Drawing Figures

WELD METAL DEPOSIT COATED TOOL STEEL

This application is a continuation-in-part of application Ser. No. 702,469 filed July 6, 1976, and now abandoned.

BACKGROUND OF THE INVENTION

This invention relates to weld metal deposits suitable for forming hard facings on metallic articles such as, for example, work rolls or backup rolls for use in a rolling mill for metal.

It is well-known practice to use arc welding to provide various articles, including rolls for hot rolling mills, with a facing of a wear-resistant alloy. Below are listed some examples of weld metal compositions which have been used in facings on rolls for hot rolling mills:

| Example No. | 1 | 2 | 3 | 4 |
|---|---|---|---|---|
| C % | 0.22 | 1.10 | 0.05 | 0.08 |
| Si % | 1.0 | 1.25 | 0.30 | 0.55 |
| Mn % | 0.5 | 1.10 | 1.50 | 1.30 |
| Cr % | 5.0 | 7.70 | 4.80 | 2.5 |
| Mo % | 11 | 1.00 | 0.63 | 1.0 |
| V % | 0.3 | — | — | — |
| W % | — | 1.60 | — | — |
| Fe | remainder | remainder | remainder | remainder |

The weld deposit of Example 2 has the best wear-resistance but also has a strong tendency to form hot cracks (solidification cracks) and therefore can in practice be used in such cases only when hot cracks in the weld deposit are allowable, for instance, in rollers for roller conveyors and other rollers subjected to comparatively low working pressures. Weld deposits according to Examples 1, 3 and 4, and similar alloys, are less subject to cracks and have been used in practice as a coating material for work rolls in hot rolling mills, that is, rolls required to perform a hot metal rolling operation. Economical considerations, however, frequently exclude the use of the known deposit alloys, the wear-resistance or useful life obtainable with the resulting facings proving insufficient to weigh up the cost of their use for the repair or the manufacture of rolls for hot rolling mills.

It is an object of the invention to provide an improved weld metal deposit particularly suited for hard facing purposes which has little or no tendency to cracking and has a satisfactory hardness combined with a high resistance to wear. A more particular object is the provision of a weld metal deposit of a composition particularly suited for the hard facing of hot working tools, that is, tools used for the working of metals at elevated temperatures, for instance, drop forging dies, pressing dies, extruding press nozzles, dies for die casting machines, mandrels for piercing mills, mandrels for the hot drawing of tubes and rolls for hot rolling mills.

DETAILED DESCRIPTION

Figure 1:
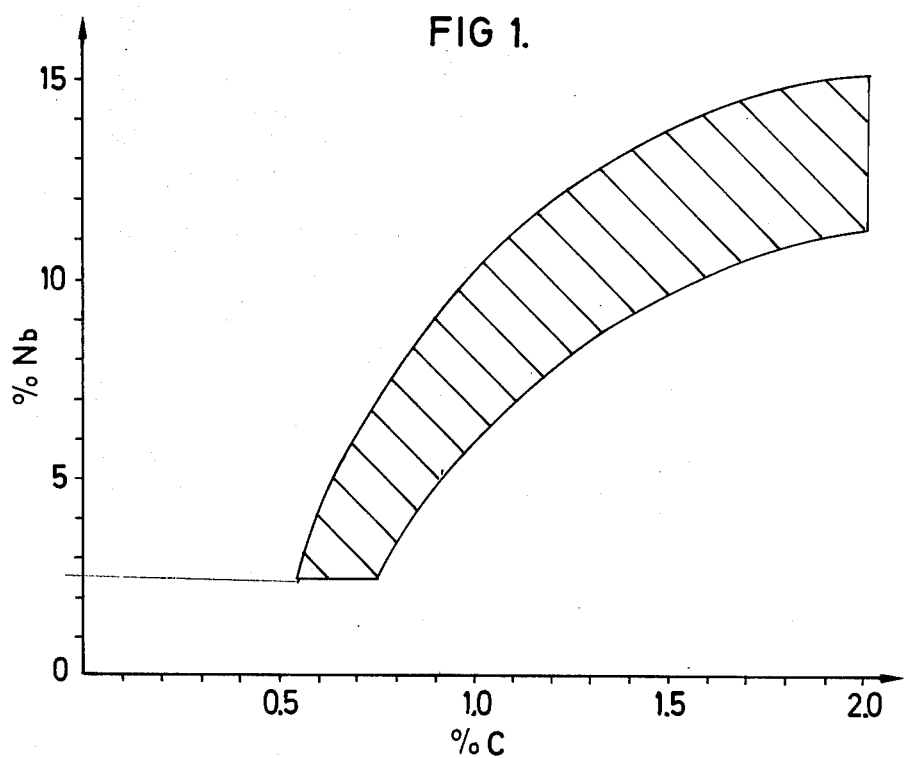
FIG. 1 is a graph setting forth the percentage of niobium versus the percentage of carbon in the weld metal deposit composition of the present invention.

The improved weld metal deposit according to the invention has substantially the following composition:

| | Percent | | |
|---|---|---|---|
| C | 0.55 | to | 2.0 |
| Si | 0.2 | to | 4.0 |
| Mn | 0.2 | to | 3.0 |
| Cr | 4.0 | to | 15.0 |
| Strong carbide formers other than niobium, totally | 0 | to | 3.5 |
| Ni | 0 | to | 0.5 | remainder substantially iron with or without incidental impurities, the contents of carbon and niobium being in a ratio of one to another as defined by the area indicated in FIG. 1 of the accompanying drawings.

The term "strong carbide formers other than niobium" should be understood to indicate the metals tungsten, molybdenum, vanadium and titanium.

As the niobium metal or ferroniobium commercially available usually contains some tantalum as an impurity, the weld metal deposit of the invention usually will contain some tantalum.

In a preferred form of the invention, the weld metal deposit contains 0.6% to 1.5% molybdenum. Further, the silicon content of the weld metal deposit according to the invention preferably should amount to from about 1 to 2 times the carbon content.

The body of a hot working tool, for instance, a roll for a hot rolling mill, to be provided with a wear-resistant coating according to the invention does not itself have to consist of a wear-resistant material but should have adequate strength, toughness and weldability. Suitable materials are plain carbon steels having a carbon content of 0.3% to 0.8% as well as various low alloy structural steels, the total alloy content of which will always be considerably below the one contained in the weld metal according to the invention.

The weld deposit according to the invention may be produced by any suitable welding process, including the electroslag welding process. Preferably, however, the weld deposit is produced by electric arc welding with a consumable electrode which may be either a bare electrode (in submerged arc welding and gas-shielded welding) or a flux coated electrode (in manual welding). The bare electrodes to be used in submerged arc welding and gas-shielded welding preferably consist of a mild stell sheath enclosing a filling of alloying agents compounded so as to provide, in combination with the mild steel sheath, the required composition of the weld metal deposited. The filling may also contain specific deoxidizing agents. The filling compound of an electrode for gas-shielded arc welding also may include a proportion of fluxing agents to provide a flux shield supplementing the protection of the molten weld metal afforded by the shielding gas. A flux coated electrode for manual welding may have a mild steel core, the required alloy constituents of the flux coating, which should preferably be of the lime basic type.

When the weld metal deposit of the invention is produced by the submerged arc welding process, preferably a self-releasing flux of the neutral or basic type should be employed. The term "self-releasing" indicates that the layer of solidified slag produced by the welding process does not adhere to the weld metal deposit but peels off in large fragments.

The deposited weld metal according to the invention exhibits, in spite of its relatively high content of carbon, a high degree of safety against the occurrence of hot cracks in the welding operation. This favorable property can be explained as an effect of the niobium content of the alloy, which according to the invention has to be suited to the carbon content. Investigations have shown that the niobium combines with a substantial part of the carbon of the alloy to form niobium carbides. These carbides start to form at an early stage of the solidification process and consequently prevent the segregation of a liquid rich in carbon which is a condition for the occurrence of hot cracks.

The weld metal deposit of the invention has a strength and toughness adequate for the very testing conditions to which a facing of a hot working tool is subjected. Moreover, the deposit has a superior resistance to wear, including the wear exerted by the hot workpieces upon the working surface of a hot working tool. The improved wear-resistance of the deposit is believed to be due principally to the presence of a substantial proportion of niobium carbides in the metal. The weld metal deposit of the invention is also very resistant to thermal cracking (sometimes referred to as "fire cracking" or "thermal fatigue"). Thermal fatigue is caused by a gradual increase of the length and depth of minute surface cracks in the working face of hot working tools and can be represented by a graph showing the crack length as a function of the number of thermal cycles to which the deposit has been subjected. With the weld deposit according to the invention, the rate of growth of the thermal cracks is very small, so that the useful life of a facing consisting of the weld metal deposit of the invention is determined mainly by the wear properties of the surface.

The chromium content of the weld metal deposit is important for improving the hot strength of the steel (to which the resistance to thermal cracking is principally due) and the oxidation resistance of the steel. The chromium performs an additional important function in imparting to the steel the metallurgical transformation characteristics required for obtaining a desirable structure of the metal matrix of the deposit.

In hard facing with steel alloys of the general type to which the weld metal alloy according to the invention belongs, that is, air hardening alloy steels, it is well-known practice to preheat the workpiece to be hardfaced to a temperature above the temperature Ms at which martensite starts to form in the weld metal and within a temperature range in which the austenite remains untransformed or is subjected to a minimum of transformation during a period of sufficient length for carrying out the entire welding operation.

A preheating temperature in the range between 400° C. and 500° C. is preferred. These rules apply to the production of the weld metal deposit according to the invention as well. Owing to the comparatively high preheating temperature, the first layer of the weld will consist of a mixture of deposited metal with a comparatively high proportion of fused parent material. As a rule, therefore, it will be necessary to deposit at least two, preferably three layers on top of each other in order to ensure that the top layer has a composition substantially identical with the metal deposited by the welding electrode. It is possible, however, by the use of special techniques, to make the dilution of the metal of the first layer with parent material low enough to obtain the desired composition of the facing by the deposition of a single layer.

The general range of compositions according to the invention can be subdivided according to the carbon content of the alloy into three groups having different metallurgical structures:

| Group | Carbon Content % | Structure of the Matrix |
|---|---|---|
| 1 | 0.55 to 0.8 | martensitic/bainitic |
| 2 | 0.8 to 1.2 | predominantly martensitic |
| 3 | 1.2 to 2.0 | ferritic. |

A specific example within each of the above three groups will now be described.

EXAMPLE I

| | Percent |
|---|---|
| C | 0.65 to 0.7 |
| Si | 0.5 to 1.0 |
| Mn | 0.75 to 1.25 |
| Cr | 40 to 6.0 |
| Nb | 3.2 to 4.0 |
| Mo | 1.0 to 1.25 |
| Fe | remainder, with or without incidental impurities, including sulphur up to 0.04% and phosphorus up to 0.04%. |

Figure 2:
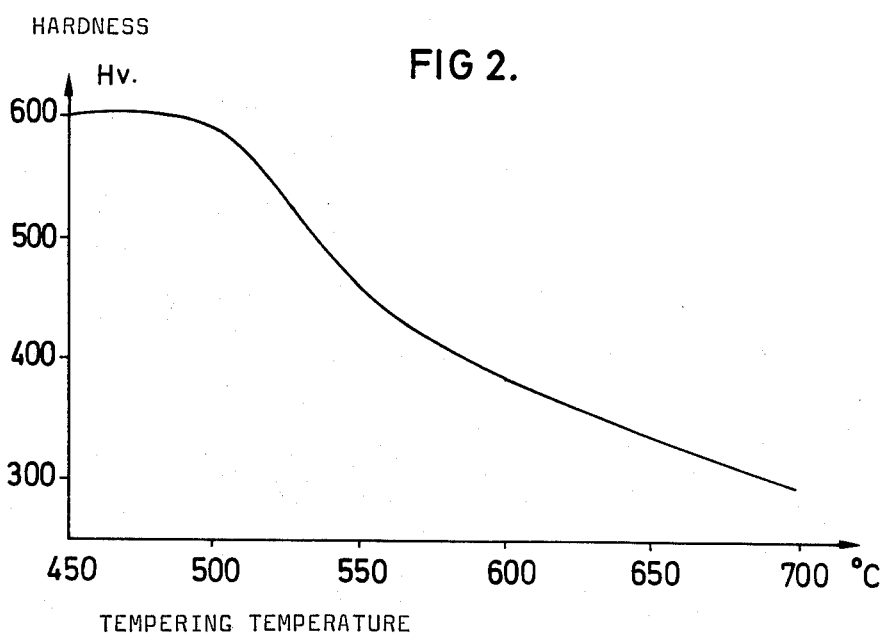
FIGS. 2–4 are tempering diagrams showing the Vickers hardness of various weld deposit compositions according to the present invention as a function of tempering temperature, each diagram referring, respectively, to compositions within the ranges set forth in Examples I-III which follow hereinbelow.

A weld deposit of this composition has a Vickers hardness which may vary between 300 and 600 Hv, depending on the choice of the tempering temperature. FIG. 2 shows a typical tempering diagram. For some compositions within the range of this Example, the hardness may exhibit a maximum ("secondary" hardness) at a tempering temperature of about 500° C.

EXAMPLE II

| | Percent |
|---|---|
| C | 1.0 to 1.2 |
| Si | 2.0 to 2.5 |
| Mn | 2.0 to 2.5 |
| Cr | 0 to 6.0 |
| Nb | 8.0 to 9.0 |
| Mo | 0.9 to 1.1 |
| Fe | remainder, with or without incidental impurities. |

Figure 3:
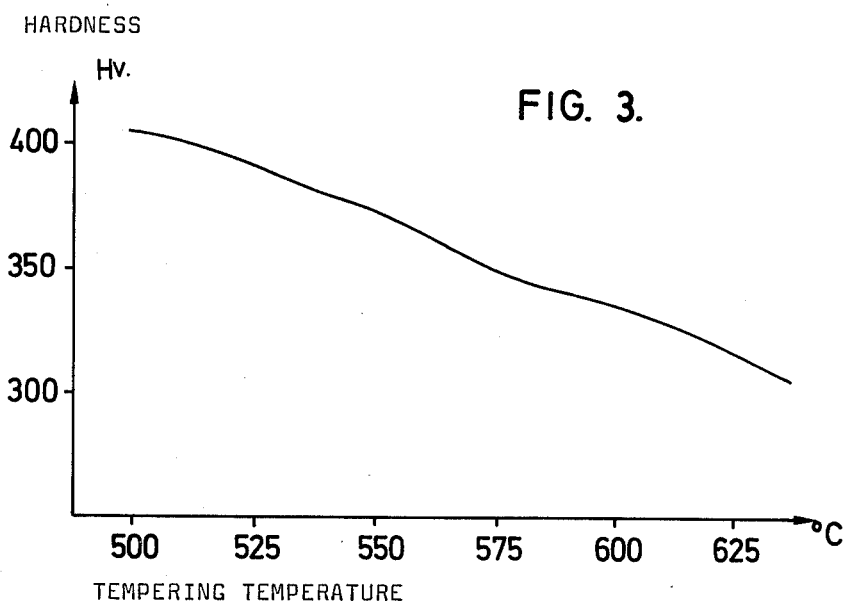

A welding deposit of this composition has a hardness in the range between 300 and 550 Hv. FIG. 3 shows a tempering diagram for a welding deposit having a composition within the range of this Example.

EXAMPLE III

| | Percent | | |
|---|---|---|---|
| C | 1.5 | to | 1.7 |
| Si | 2.75 | to | 3.25 |
| Mn | 2.0 | to | 2.5 |
| Cr | 4.0 | to | 5.0 |
| Nb | 11.5 | to | 12.5 |
| Mo | 0.7 | to | 1.0 |
| Fe | remainder, with or without incidental impurities | | |

Figure 4:
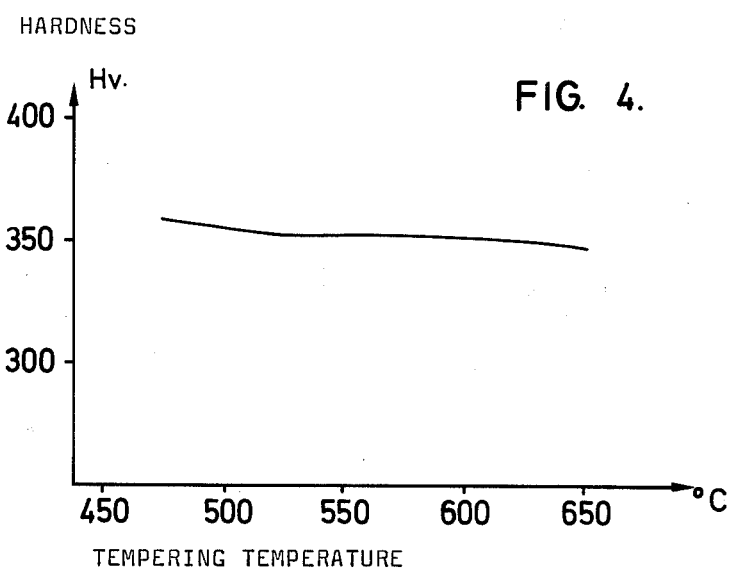

The hardness range for a weld deposit of this type covers the approximate range of 340 to 380 Hv. FIG. 4 shows a typical tempering diagram.

All of the above Examples have been used successfully for the hard facing of large work rolls for hot rolling mills in the following way. The roll to be hardfaced, which is preheated to a temperature in the range between 400° C. and 500° C. and maintained at this temperature throughout the welding operation, is rotated while a welding head for submerged arc welding is displaced slowly in the axial direction so as successively to deposit a layer built up of adjacent turns of a spiral bead. At least two, as a rule three, layers are deposited on top of each other. Welding currents in the range between 300 and 1200 amperes are used. For welding current in the upper part of this range, the use of twin electrodes (that is, a pair of single electrodes working in a common welding pool) is preferred.

While the invention has been described with a certain degree of particularity, it will be understood that the description was by way of example only and that numerous variations and modifications, as may become apparent to those of ordinary skill in the art, can be made without departing from the spirit and the scope of the invention as hereinafter claimed.

What is claimed is:

1. A weld metal deposit applied as a coating on a hot working tool, said deposit consisting essentially of 0.55% to 2.0% C, 0.2% to 4.0% Si, 0.2% to 3.0% Mn, 4.0% to 6.5% Cr, 2.5% to 15.0% Nb, 0% to 0.5% Ni, 0% to 3.5% strong carbide formers other than niobium selected from the group consisting of tungsten, molybdenum, vanadium, and titanium, the remainder being substantially iron, and the carbon and niobium content being in a ratio of one to the other as defined by the shaded area in FIG. 1 of the accompanying drawings.

2. A weld metal deposit as claimed in claim 1 containing 0.6% to 1.5% of molybdenum.

3. A weld metal deposit as claimed in claim 1 in which the silicon content amounts to from about 1 to 2 times the carbon content.

4. A weld metal deposit applied as a coating on a hot working tool, said deposit consisting essentially of:

|    | Percent      |
|----|--------------|
| C  | 0.65 to 0.70 |
| Si | 0.5 to 1.0   |
| Mn | 0.75 to 1.25 |
| Cr | 4.0 to 6.0   |
| Nb | 3.2 to 4.0   |
| Mo | 1.0 to 1.25  | the remainder being substantially iron.

5. A weld metal deposit applied as a coating on a hot working tool, said deposit consisting essentially of:

|    | Percent    |
|----|------------|
| C  | 1.0 to 1.2 |
| Si | 2.0 to 2.5 |
| Mn | 2.0 to 2.5 |
| Cr | 4.0 to 6.0 |
| Nb | 8.0 to 9.0 |
| Mo | 0.9 to 1.1 | the remainder being substantially iron.

6. A weld metal deposit applied as a coating on a hot working tool, said deposit consisting essentially of:

|    | Percent       |
|----|---------------|
| C  | 1.5 to 1.7    |
| Si | 2.75 to 3.25  |
| Mn | 2.0 to 2.5    |
| Cr | 4.0 to 5.0    |
| Nb | 11.5 to 12.5  |
| Mo | 0.7 to 1.0    | the remainder being substantially iron.

7. A hot working tool comprising a body of steel and a weld metal deposit forming a wear-resistant coating thereon, said weld metal deposit consisting essentially of 0.55% to 2.0% C, 0.2% to 4.0% Si, 0.2% to 3.0% Mn, 4.0% to 6.5% Cr, 2.5% to 15.0% Nb, 0% to 0.5% Ni, 0% to 3.5% strong carbide formers other than niobium selected from the group consisting of tungsten, molybdenum, vanadium, and titanium, the remainder being substantially iron, and the carbon and niobium content being in a ratio of one to the other as defined by the shaded area in FIG. 1 of the accompanying drawings.

8. A hot working tool as claimed in claim 7 in which said weld metal deposit contains 0.6% to 1.5% of molybdenum.

9. A hot working tool as claimed in claim 7 in which the silicon content of said weld metal deposit amounts to from about 1 to 2 times the carbon content.

10. A hot working tool comprising a body of steel and a weld metal deposit forming a wear-resistant coating thereon, said weld metal deposit consisting essentially of:

|    | Percent      |
|----|--------------|
| C  | 0.65 to 0.70 |
| Si | 0.5 to 1.0   |
| Mn | 0.75 to 1.25 |
| Cr | 4.0 to 6.0   |
| Nb | 3.2 to 4.0   |
| Mo | 1.0 to 1.25  | the remainder being substantially iron.

11. A hot working tool comprising a body of steel and a weld metal deposit forming a wear-resistant coating thereon, said weld metal deposit consisting essentially of:

|    | Percent    |
|----|------------|
| C  | 1.0 to 1.2 |
| Si | 2.0 to 2.5 |
| Mn | 2.0 to 2.5 |
| Cr | 4.0 to 6.0 |
| Nb | 8.0 to 9.0 |
| Mo | 0.9 to 1.1 | the remainder being substantially iron.

12. A hot working tool comprising a body of steel and a weld metal deposit forming a wear-resistant coating thereon, said weld metal deposit consisting essentially of:

|    | Percent       |
|----|---------------|
| C  | 1.5 to 1.7    |
| Si | 2.75 to 3.25  |
| Mn | 2.0 to 2.5    |
| Cr | 4.0 to 5.0    |
| Nb | 11.5 to 12.5  |
| Mo | 0.7 to 1.0    | the remainder being substantially iron.

13. A hot working tool comprising a body of steel and a weld metal deposit forming a wear-resistant coating thereon, said weld metal deposit consisting essentially of 0.55% to 2.0% C, 0.2% to 4.0% Si, 0.2% to 3.0% Mn, 4.0% to 6.5% Cr, 2.5% to 15.0% Nb, 0% to 0.5% Ni, 0% to 3.5% strong carbide formers other than niobium selected from the group consisting of tungsten, molybdenum, vanadium, and titanium, the remainder being substantially iron, and the carbon and niobium content being in a ratio of one to the other as defined by the shaded area in FIG. 1 of the accompanying drawings, said steel body having a composition outside the range of compositions above specified.

* * * * *

UNITED STATES PATENT AND TRADEMARK OFFICE
CERTIFICATE OF CORRECTION

PATENT NO. : 4,110,514
DATED      : August 29, 1978
INVENTOR(S) : Frederick Nicholson It is certified that error appears in the above-identified patent and that said Letters Patent are hereby corrected as shown below:

In the table appearing in Column 1, the line reading:

```
"  Mo%        11        1.00      0.63      1.0  "
                    should read
-- Mo%        1.1       1.00      0.63      1.0  --.
```

In Column 4, under Example I, the line reading:

```
"  Cr         40 to 6.0  "
 should read
--  Cr        4.0 to 6.0  --.
```

In Column 4, under Example II, the line reading:

```
"  Cr         0 to 6.0"
 should read
--  Cr        4.0 to 6.0  --.
```

Signed and Sealed this

Tenth Day of April 1979

[SEAL]

Attest:

RUTH C. MASON
*Attesting Officer*

DONALD W. BANNER
*Commissioner of Patents and Trademarks*